(12) United States Patent
Kisanuki et al.

(10) Patent No.: US 8,519,293 B2
(45) Date of Patent: Aug. 27, 2013

(54) GAS-INSULATED POWER APPARATUS

(75) Inventors: Osamu Kisanuki, Chiyoda-ku (JP);
Hitoshi Sadakuni, Chiyoda-ku (JP)

(73) Assignee: Mitsubishi Electric Corporation,
Chiyoda-Ku, Tokyo (JP)

( * ) Notice: Subject to any disclaimer, the term of this patent is extended or adjusted under 35 U.S.C. 154(b) by 742 days.

(21) Appl. No.: 12/083,194

(22) PCT Filed: Mar. 31, 2006

(86) PCT No.: PCT/JP2006/306883
§ 371 (c)(1),
(2), (4) Date: Apr. 7, 2008

(87) PCT Pub. No.: WO2007/116480
PCT Pub. Date: Oct. 18, 2007

(65) Prior Publication Data
US 2009/0266796 A1    Oct. 29, 2009

(51) Int. Cl.
*H01H 33/02*    (2006.01)

(52) U.S. Cl.
USPC .......................................... 218/155; 218/13

(58) Field of Classification Search
USPC ............. 218/152–155, 2–7, 14, 43–45, 78, 218/84
See application file for complete search history.

(56) References Cited

U.S. PATENT DOCUMENTS

| | | | | |
|---|---|---|---|---|
| 6,127,641 A | * | 10/2000 | Meinherz | 218/43 |
| 6,538,224 B2 | * | 3/2003 | Furuta et al. | 218/43 |
| 6,680,453 B2 | * | 1/2004 | Rokunohe et al. | 218/2 |

FOREIGN PATENT DOCUMENTS

| | | |
|---|---|---|
| CN | 1097904 A | 1/1995 |
| JP | 50-7739 B1 | 3/1975 |
| JP | 52-97431 | 7/1977 |
| JP | 54-177578 U | 12/1979 |
| JP | 56-152519 U | 11/1981 |
| JP | 57-155911 U | 9/1982 |
| JP | 61-9112 A | 1/1986 |
| JP | 03-003122 U | 1/1991 |
| JP | 10-172372 A | 6/1998 |
| JP | 2002-051440 A | 2/2002 |

OTHER PUBLICATIONS

International Search Report dated Jul. 11, 2006.

* cited by examiner

*Primary Examiner* — Amy Cohen Johnson
*Assistant Examiner* — Marina Fishman
(74) *Attorney, Agent, or Firm* — Buchanan Ingersoll & Rooney PC

(57) ABSTRACT

In a gas-insulated power apparatus in which contiguous vessels 11, 12 (GIBC1, GIBC2) are coupled by way of flanges 111, 121 of respectives thereof, and power conductors 112, 122 (GIBC5) insulated from the vessels by an insulating gas 13 are included in the vessels, by squeezing the flange 111 of the vessel on one side to be coupled by a pressing member 14 screwed to the flange 121 of the vessel on other side and the flange 121 of the vessel on other side, positions of the vessel on one side and the vessel on other side coupled as described above relative to each other can be shifted in a peripheral direction of the flange, and therefore, even when a direction of leading out a gas-insulated bus or the like becomes various depending on products, various directions can be dealt with out depending only on design of respective product specifications.

18 Claims, 7 Drawing Sheets

GAS-INSULATED POWER APPARATUS

TECHNICAL FIELD

The present invention relates to a gas-insulated power apparatus in which contiguous vessels are coupled by way of flanges of respectives thereof and a power conductor insulated from the vessel by an insulating gas is included in the vessel.

BACKGROUND ART

According to the gas-insulated apparatus of a gas-insulated opening/closing apparatus, a gas-insulated transformation apparatus, a gas-insulated bus or the like, a plurality of vessels are connected in airtight, and a power apparatus main body of a circuit breaker, a disconnecting switch, a grounding switch, a power conductor or the like is included in the hermetically closed vessel connected in airtight and enclosed with an insulating gas.

According to the gas-insulated power apparatus, for example, a vessel of a gas-insulated bus led from the gas-insulated opening/closing apparatus or the like is coupled to a vessel of the gas-insulted opening/closing apparatus by fastening flange portions of respectives thereof by a bolt. Further, there is a case in which the led out gas-insulated bus is prolonged, and in this case, a bellows in series coupling is used for the vessel per se of the gas-insulated bus in order to absorb thermal elongation/contraction of the gas-insulated bus per se (for example, refer to Patent Reference 1).

Patent Reference 1: JP-A-2002-51440 (FIG. 1 and explanation thereof)

DISCLOSURE OF THE INVENTION

Problems that the Invention is to Solve

Although according to the gas-insulated power apparatus, as described above, for example, the vessel of the gas-insulated bus led out from the gas-insulated opening/closing apparatus or the like is coupled with the vessel of the gas-insulated opening/closing apparatus by fastening the respective flanges by the bolt, a direction of leading out the gas-insulated bus (also referred to as angle swinging) is various depending on a product, and therefore, the vessel, the flange or the like is designed for each product specification. Further, there are needed a number of the bellows coupled in series with the vessel per se of the gas-insulated bus in order to absorb the thermal elongation/contraction of the gas-insulated bus per se when the gas-insulated bus is prolonged.

Therefore, even when the direction of leading out the gas-insulated bus or the like (angle swinging) is various depending on the product, it is preferable when there is a mechanism having a degree of freedom capable of dealing therewith out depending on only the design for each product specification, and it is further preferable when the mechanism can be used as a substitute for the bellows.

The invention has been carried out in view of the above-described actual situation, it is a principal object thereof to realize a mechanism having a degree of freedom capable of dealing therewith out depending only on a design for each product specification and it is other object thereof to realize a mechanism capable of being used as a substitute for the bellows.

Means for Solving the Problems

A gas-insulated power apparatus of the invention is a gas-insulated power apparatus in which contiguous vessels are coupled by way of flanges of respectives thereof and power conductors insulated from the vessels by an insulating gas are included in the vessels, wherein the contiguous vessels are coupled by squeezing a flange of the vessel on one side to be coupled by a pressing member screwed to a flange of the vessel on other side and a flange of the vessel on other side, and positions of the vessel on one side and the vessel on other side to be coupled relative to each other in a peripheral direction of the flange can be shifted.

Further, a gas-insulated power apparatus according to the invention is a gas-insulated power apparatus comprising a first and a second vessel including power conductors insulated by a gas and a connection vessel for connecting the first and the second vessel, wherein at least one of coupling of the first vessel and the connection vessel contiguous to each other and coupling of the second vessel and the connection vessel contiguous to each other is carried out by squeezing a flange of the vessel on one side to be coupled by a pressing member screwed to a flange of the vessel on other side and a flange of the vessel on other side, and positions of the first vessel and the second vessel relative to each other can be permitted to change.

Advantage of the Invention

According to the invention, in the gas-insulated power apparatus in which the contiguous vessels are coupled by way of the flanges of the respectives, and the power conductors insulated from the vessels by the insulating gas are included in the vessels, the contiguous vessels are coupled by squeezing the flange of the vessel on one side to be coupled by the pressing member screwed to the flange of the vessel on other side and the flange of the vessel on other side, and therefore, the positions of the vessel on one side and the vessel on other side to be coupled relative to each other in the peripheral direction of the flange can be shifted, and therefore, integration or installation of various products can flexibly be dealt with out depending only on design for respective product specifications.

Further, according to the invention, there is provided the gas-insulated power apparatus comprising the first and the second vessels including the power conductors insulated by the gas and the connection vessel for connecting the first vessel and the second vessel, wherein at least one of coupling of the first vessel and the connection vessel contiguous to each other and coupling of the second vessel and the connection vessel contiguous to each other is carried out by squeezing the flange of the vessel on one side to be coupled by the pressing member screwed to the flange of the vessel on other side and the flange of the vessel on other side, and therefore, the positions of the first vessel and the second vessel relative to each other can be permitted to change, and therefore, integration or installation of various products can flexibly be dealt with out depending only on design for respective product specifications, further, the invention can be used as a substitute for a bellows.

BEST MODE FOR CARRYING OUT THE INVENTION

Embodiment 1

Figure 1:
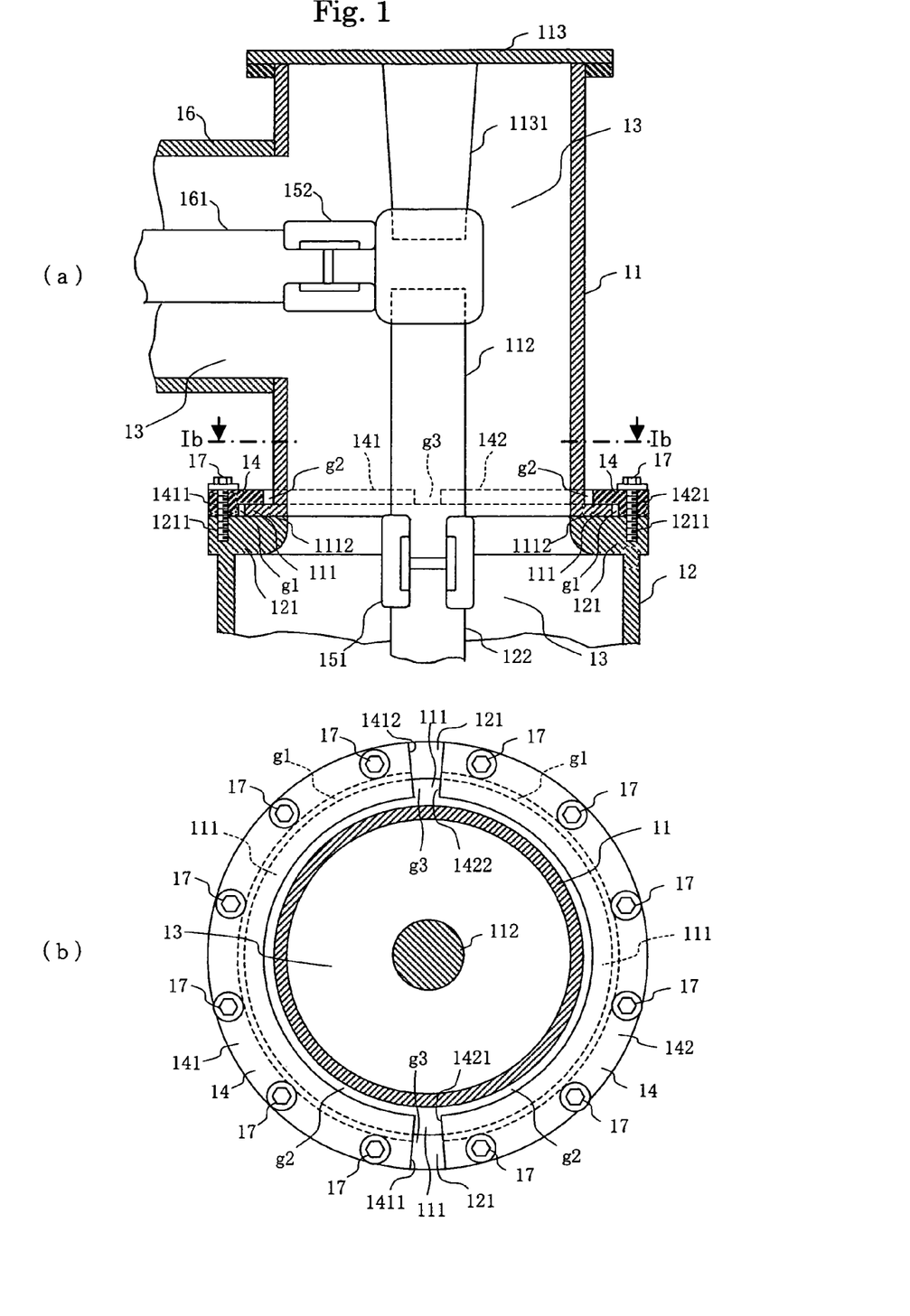
FIG. 1 illustrates views showing Embodiment 1 of the invention and views showing a case of an essential portion of a gas-insulated power apparatus.

Embodiment 1 of the invention will be explained in reference to FIG. 1 as follows. FIG. 1 illustrates views showing an example of an essential portion of a gas-insulated power apparatus, FIG. 1(*a*) is a vertical sectional side view, FIG. 1(*b*) is a cross-sectional plane view viewing a section at a line Ib-Ib of FIG. 1(a) in an arrow mark direction. Further, in FIG. 1(a) and FIG. 1(b), the same portion are attached with the same notations.

In FIG. 1(a) and FIG. 1(b), there is exemplified an example of a gas-insulated power apparatus 1 in which contiguous vessels 11, 12 are coupled by way of flanges 111, of respectives thereof, and power conductors 112, 122 insulated from the vessels 11, 12 by an insulating gas 13 are included in the corresponding vessels 11, 12, and the contiguous vessels 11, 12 are coupled by squeezing the flange of the vessel 11 on one side to be coupled by a pressing member 14 screwed to the flange 121 of the vessel 12 on other side and the flange 121 of the vessel 12 on other side.

The vessels 11, 12 are constituted by a ring-like shape, and the respective flanges 111, 121 are constituted by a ring-like shape. According to the pressing member 14, a plurality of pieces 141, 142 are arranged in a ring-like shape along the flanges 111, 121 in the ring-like shape.

The power conductors 112, 122 at inside of the respective vessels 11, 12 are coaxially arranged, the coaxial power conductors 112, 122 are connected by an in-vessel power conductor connector 151 of a tulip contact or the like permitting the power conductors 112, 122 to elongate and contract in an axial direction and permitting the power conductors 112, 122 to pivot in a peripheral direction.

The power conductors 112, 122 at inside of the vessels 11, 12 are insulated from the vessels 11, 12 by a column-like insulating spacer 1131 attached to an end portion hermetically closing lid 113 of the at least one vessel 11.

A branch pipe shape vessel 16 is connected to the at least one vessel 11, the power conductor 112 at inside of the vessel is connected with a power conductor 161 at inside of the branch pipe shape vessel 16 by way of a power conductor connector 152 at inside of the branch pipe shape vessel permitting the power conductor 161 at inside of the branch pipe shape vessel 16 to elongate and contract in an axial direction, and the power conductor 161 at inside of the branch pipe shape vessel 16 is insulated from the branch pipe shape vessel 16 and the vessel 11 by the column-like insulating spacer 1131 for insulating the power conductor 112 at inside of the vessel 11 from the vessel 11.

Further, when viewed by changing a view point, the gas-insulated apparatus according to Embodiment 1 includes the first and the second vessels 12, 16 including the power conductors 122, 161 insulated by the gas and the connecting vessel 11 for connecting the first vessel 12 and the second vessel 16, and at least one of coupling of the first vessel 12 and the connecting vessel 11 contiguous to each other and coupling of the second vessel 16 and the connecting vessel 11 contiguous to each other is carried out by squeezing the flange 111 of the vessel 11 on one side to be coupled by the pressing member 14 screwed to the flange 121 of the vessel 12 on other side and the flange 121 of the vessel 12 on other side.

All of the included power conductors 112, 122, 161 of respectives of the first vessel 12, the second vessel 16, and the connecting vessel 11 are insulated from the corresponding vessels 11, 12, 16 by the column-like insulating spacer 1131 attached to the end portion hermetically closing lid 113 of the vessel 11.

By bringing the flange 111 of the vessel 11 on one side and the flange 121 of the vessel 12 on other side into press contact with each other, the two flanges 111, 121 are permitted to slide relative to each other in a peripheral direction and airtightness between the two flanges 111, 121 is maintained.

The flange 121 and the pressing member 14 which are squeezing and the flange 111 which is squeezed comprise different kinds of metals. The flange 121 and the pressing member 14 which are squeezing comprise, for example, a ferrous conductive metal, and the flange 111 which is squeezed comprises, for example, an aluminum species conductive metal. When the flange 121 and the pressing member 14 which are squeezing and the flange 111 which is squeezed comprise different kinds of metals, burning at sliding faces 1112 between the two flanges 111, 121 is prevented when the two flanges 111, 121 are slid relative to each other in the peripheral direction under a state of squeezing the flange 111.

A semi solid state lubricant of grease or the like is coated at portions of the flange 111 of the vessel 11 on one side and the flange 121 of the vessel 12 on other side brought into press contact with each other. The semi solid state lubricant coated at the portions of the flange 111 of the vessel 11 on one side and the flange 121 of the vessel 12 on other side brought into press contact with each other maintains the airtightness between the two flanges 111, 121 further excellently.

A lubrication layer of coating of, for example, almite plating, teflon (registered trademark) or the like may be applied to the portions of the flange 111 of the vessel 11 on one side and the flange 121 of the vessel 12 on other side brought into press contact with each other. The lubrication layer applied to the portions brought into press contact with each other permits the two flanges 111, 121 to slide relative to each other further smoothly in peripheral directions of the two flanges 111, 121 under the state of squeezing the flange 111 of the vessel 11 on one side by the pressing member 14 screwed to the flange 121 of the vessel 12 on other side and the flange 121 of the vessel 12 on other side while maintaining the airtightness.

The respective pressing members 141, 142 in a shape of a circular arc or a C-like shape constituting the pressing member 14 in the ring-like shape are screwed to the flange 121 of the vessel on other side (the first vessel) 12 by respectively by a plurality of pieces of bolts 17.

The bolts 17 penetrate the respective pressing members 141, 142 without being screwed therewith and screwed to the flange 121 of the vessel on other side (the first vessel) 12. That is, the bolts 17 penetrate bolt through holes 1411, 1421 provided at the respective pressing members 141, 142 movably and pivotably and screwed to screw holes 1211 constituting female screws provided at the flange 121 of the vessel on other side (the first vessel) 12.

The pressing member 14 in the ring-like shape is constituted by the plurality of divided pressing members 141, 142, and the pressing members 141, 142 of respective divided structures are mounted to the flange 121 of the vessel on other side (which is also the first vessel) 12 attachably and detachably by the bolts (fastening members) 17. Owing to a structure of squeezing the flange 111 of the vessel on one side (which is also the connecting vessel) 11 by the pressing member 14 and the flange 121 of the vessel on other side (first vessel) 12 by such mounting operation, the pressing members 141, 142 can be mounted as described above after adjusting relative positions in the peripheral direction of the contiguous vessels 11, 12 to predetermined positions, or after adjusting the swing angle of the vessel (which is also the branch pipe shape vessel) 16 relative to the vessel 12, and a degree of freedom of design or installation of the vessels 11, 12, 16 is extremely promoted.

When the relative positions in the peripheral direction of the contiguous vessels 11, 12 are adjusted, or when the swing angle of the vessel (which is also the branch pipe shape vessel) 16 relative to the vessel 12 is adjusted, the contiguous vessels 11, 12 are pivoted relative to each other in the peripheral direction. In accordance with relatively pivoting the vessels 11, 12 in the peripheral direction, also the power conductors 112, 122 at inside thereof are relatively pivoted in the peripheral direction. The relative pivoting in the peripheral direction of the power conductors 112, 122 is permitted by the in-vessel power conductor connector 151 of a tulip contact or the like.

A gap g1 is formed between respective large diameter inner peripheral faces of the pressing members 141, 142 and an outer peripheral face of the flange 111 of the vessel 11 on one side, and the gap g1 permits the pressing members 141, and the flange 111 of the vessel 11 on one side to thermally elongate and contract in diameter directions of respectives thereof.

Similarly, a gap g2 is formed between respective small diameter inner peripheral faces of the pressing members 141, 142 and an outer peripheral face of the vessel 11 on one side, and the gap g2 permits the pressing members 141, 142 and the vessel 11 on one side to thermally elongate and contract in diameter directions of respectives thereof.

Similarly, a gap g3 is formed between respective end faces 1412, 1422 in the peripheral direction of the pressing members 141, 142 and the gap g3 permits the pressing members 141, 142 to thermally elongate and contract in the diameter direction and thermally elongate and contract in the peripheral direction.

The second vessel (which is also the branch pipe shape vessel) 16 is, for example, a gas-insulated connection conductor from a bushing lead out bus, an elongated gas-insulated bus, a gas-insulated switch to a feed line or the like.

Embodiment 2

Figure 2:
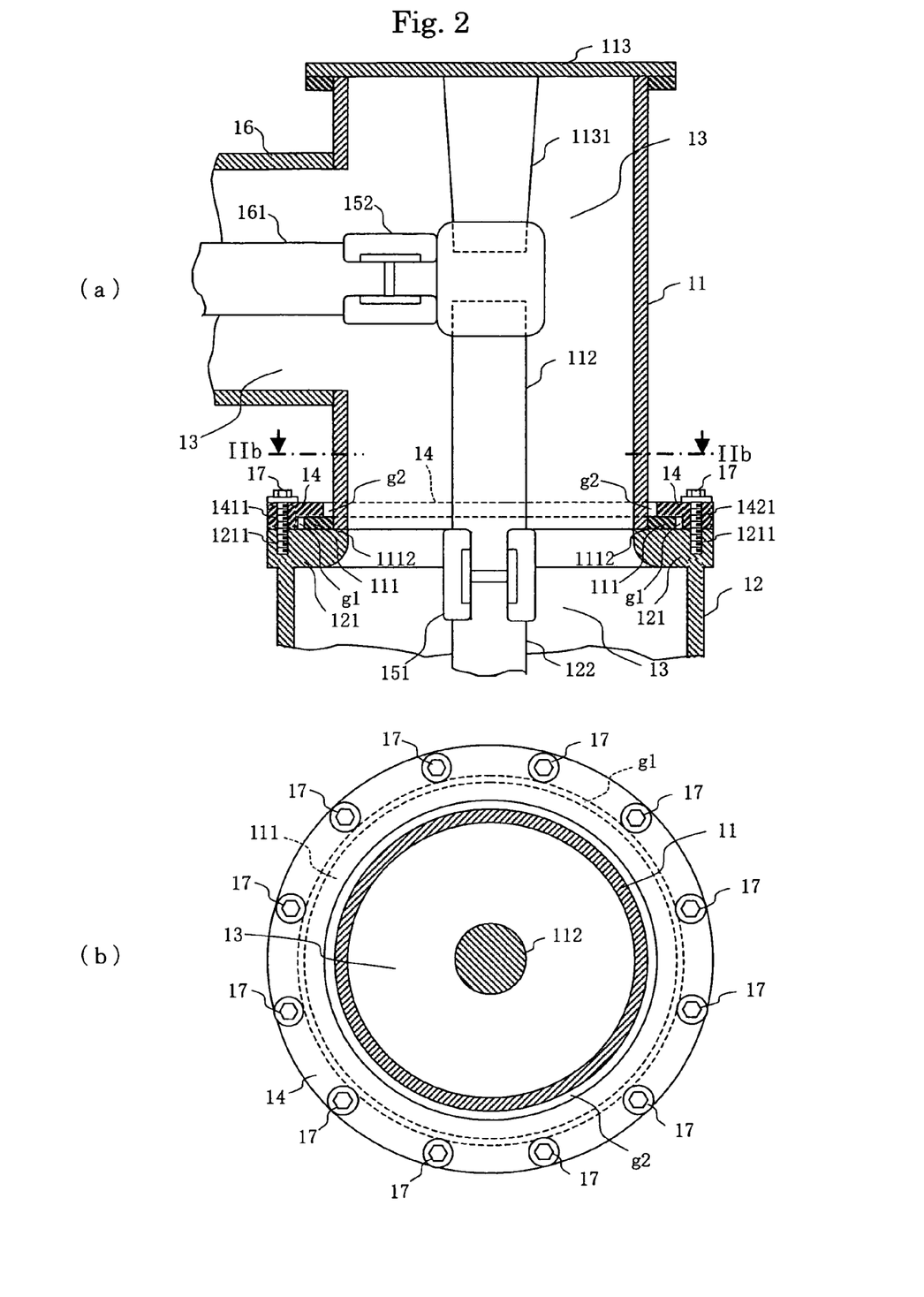
FIG. 2 illustrates views showing Embodiment 2 of the invention and views showing other case of an essential portion of a gas-insulated power apparatus.

Embodiment 2 of the invention will be explained in reference to FIG. 2 as follows. FIG. 2 illustrates views showing other example of an essential portion of a gas-insulated power apparatus, FIG. 2(*a*) is a vertical sectional side view, FIG. 2(*b*) is a cross-sectional plane view viewing a section at a line IIb-IIb of FIG. 2(*a*) in an arrow mark direction. Further, in FIG. 2(*a*) and FIG. 2(*b*), portions the same as or corresponding to those of FIG. 1(*a*), FIG. 1(*b*) are attached with the same notations and Embodiment 2 of the invention will be explained as follows mainly of a point different from that of Embodiment 1 of the invention.

According to Embodiment 2 of the invention, as shown in FIG. 2(*a*) and FIG. 2(*b*) the pressing member 14 is constituted by a shape of a continuous ring in correspondence with the flange 111 in the ring-like shape and is fitted to the vessel 11 on one side before integrally attaching the flange 111 to the vessel on one side (the connecting vessel) 11 by welding or the like.

In other words, the pressing member 14 according to Embodiment 2 of the invention is constituted not by the structure divided into a plurality of pieces as in the pressing member 14 of Embodiment 1 of the invention but by a continuous integrated structure.

Also in a case of Embodiment 2 of the invention, similar to the case of Embodiment 1 of the invention, the gaps g1, g2 are provided, and therefore, even when the pressing member 14 is fitted to the vessel 11 on one side before integrally attaching the flange 111 to the vessel 11 on one side, similar to the case of Embodiment 1 of the invention, before the vessel on other side (the first vessel) 12 being screwed to the flange 121 by the bolt 17, the vessel on other side (the first vessel) 12 and the flange 121 thereof can be pivoted around the vessel 11 on one side and the flange 111. Therefore, even when the positions in the peripheral direction of the vessel on one side (the connecting vessel) 11 and the vessel on other side (the first vessel) 12 constituted by any positions, further, even when the swing angle of the second vessel (the branch pipe shape vessel) 16 relative to the vessel on other side (the first vessel) 12 is constituted by any angle, the through hole bolt 1411 of the pressing member 14 can easily be matched to the screw hole 1211 of the flange 121 of the vessel 12 on other side, and the respective bolts 17 can easily and firmly be inserted to the respective bolt through holes 1411 and screwed to the respective screw holes 1211. That is, the invention can flexibly deal with integration or installation of various products without depending on only design of respective product specifications.

Embodiment 3

Figure 3:
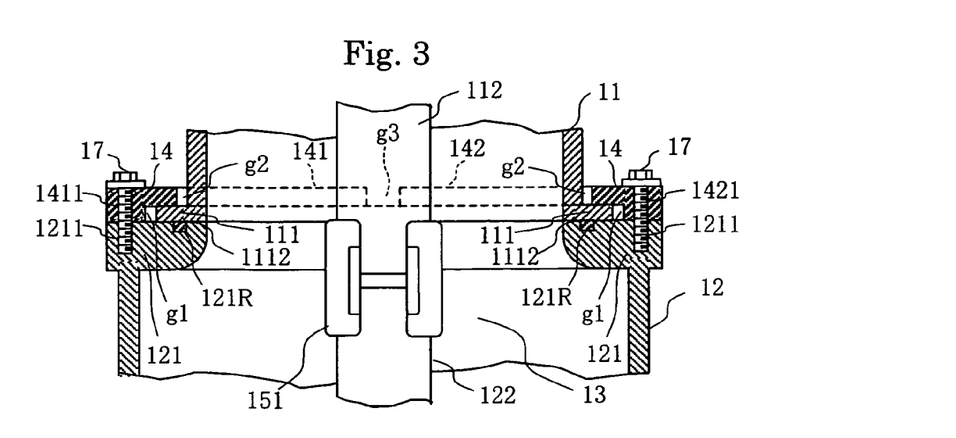
FIG. 3 is a view showing Embodiment 3 of the invention and a view showing still other case of an essential portion of a gas-insulated power apparatus.

Embodiment 3 of the invention will be explained in reference to FIG. 3 showing a still other example of an essential portion of a gas-insulated power apparatus as follows. Further, in FIG. 3, portions the same as or corresponding to those of FIG. 1, FIG. 2 are attached with the same notations and Embodiment 3 of the invention will be explained as follows with regard to a point different from those of Embodiments 1, 2 of the invention.

In Embodiment 1 of the invention, as described above, in bringing the flange 111 of the vessel 11 on one side and the flange 121 of the vessel 12 on other side into press contact with each other, the two flanges 111, 121 are permitted to slide relative to each other in the peripheral direction, and the airtightness between the two flanges 111, 121 is maintained. Further, as described above, the grease coated at the portion of bringing the flange 111 of the vessel 11 on one side and the flange 121 of the vessel 12 on other side into press contact with each other maintains the airtightness between the two flanges 111, 121 further excellently. In order to maintain the airtightness further excellently, according to Embodiment 3 of the invention, one O ring 121R is arranged at the sliding face 1112 as exemplified in FIG. 3.

The O ring 121R is attached to the flange 121 of the vessel 12 on other side a wall thickness of which is thicker than that of the flange 111 of the vessel 11 on one side, and surrounds the power conductor 112 or 122, and the in-vessel power conductor connector 151.

Embodiment 4

Figure 4:
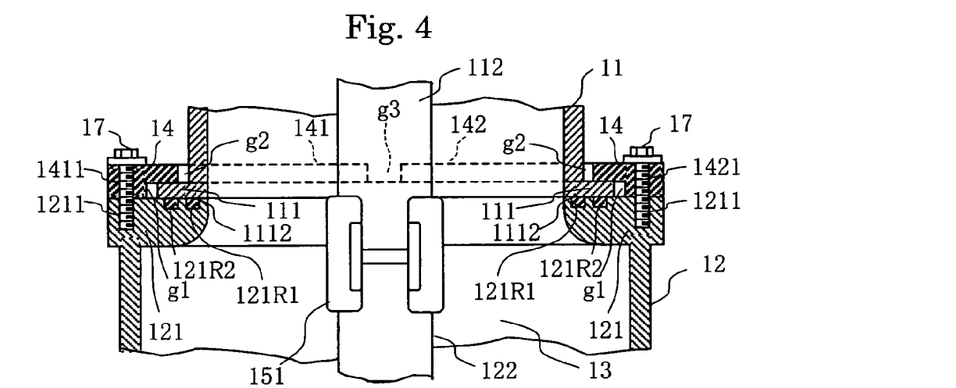
FIG. 4 is a view showing Embodiment 4 of the invention and a view showing still other case of an essential portion of a gas-insulated power apparatus.

Embodiment 4 of the invention will be explained in reference to FIG. 4 showing a still other example of an essential portion of a gas-insulated power apparatus as follows. Further, in FIG. 4, portions the same as or corresponding to those of FIG. 1, FIG. 2, FIG. 3 are attached with the same notations, and Embodiment 4 of the invention will be explained as follows mainly with regard to a point different from those of Embodiments 1, 2, 3 of the invention.

Although in Embodiment 3 of the invention, in order to further improve the airtightness between the two flanges 111, 121, there is exemplified a case of arranging the one O ring 121R at the sliding face 1112, according to Embodiment 4 of the invention, as exemplified in FIG. 4, a plurality of pieces of O rings 121R1, 121R2 are arranged at the sliding face 1112. The O ring 121R2 on an outer side concentrically surrounds the ring 121R1 on an inner side.

A plurality of pieces of O rings 121R1, 121R2 are concentrically arranged at the sliding face 1112, and therefore, the airtightness is further improved than in the case of arranging the one O ring 121R at the sliding face 1112.

Embodiment 5

Figure 5:
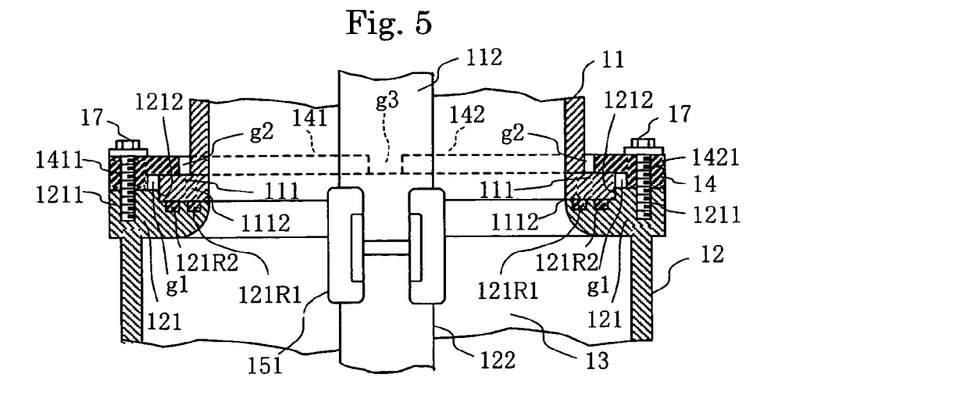
FIG. 5 is a view showing Embodiment 5 of the invention and a view showing still other case of an essential portion of a gas-insulated power apparatus.

Embodiment 5 of the invention will be explained in reference to FIG. 5 showing a still other example of an essential portion of a gas-insulated power apparatus as follows. Further, in FIG. 5, portions the same as or corresponding to those of FIG. 1, FIG. 2, FIG. 3, FIG. 4 are attached with the same notations, and Embodiment 5 of the invention will be explained as follows mainly with regard to a point different from those of Embodiments 1, 2, 3, 4 of the invention.

As shown by FIG. 5, Embodiment 5 of the invention is an example when the flange 111 which is squeezed is pivotably fitted to a fitting recess 1212 of the flange 121 which is squeezing.

The squeezed flange 111 and the squeezing flange 121 are pivoted relative to each other at the surrounding of an axis center thereof for adjusting the swing angle or the like.

When the squeezed flange 111 is not pivotably fitted to the fitting recess 1212 of the squeezing flange 121, it is necessary to carry out the pivoting operation for the adjustment or the like (that is, an integrating operation or an adjusting operation in installing at a cite) while paying careful attention such that the two flanges 111, 121 are not moved relative to each other in the diameter direction, such that a contact failure between the power conductors 112, 122 and the in-vessel power conductor connector 151 owing to a relative shift in the diameter direction of the power conductors 112, 122 is not brought about by relatively moving the two flanges 111, 121 in the diameter direction (that is, the direction orthogonal to the axis center) in the pivoting for the adjustment or the like.

In contrast thereto, when the squeezed flange 111 is pivotably fitted to the fitting recess 1212 of the squeezing flange 121, in the pivoting for the adjustment or the like, the two flanges 111, 121 are not moved relative to each other in the diameter direction (the direction orthogonal to the axis center).

Therefore, there is not brought about a contact failure between the power conductors 112, 122 and the in-vessel power conductor connector 151 owing to the relative shift in the diameter direction of the power conductors 112, 122 by relatively moving the two flanges 111, 121.

Therefore, it is not necessary to carry out the pivoting operation for the adjustment or the like (that is, the integrating operation or the adjusting operation in installing at a cite) while paying careful attention such that the two flanges 111, 121 are not moved relative to each other in the diameter direction.

In this way, according to Embodiment 5 of the invention, the operability of the pivoting operation for the adjustment or the like (That is, integrating operation or the adjusting operation in installing at a cite or the like) is promoted, an integration accuracy, an installation adjustment accuracy or the like is promoted.

Embodiment 6

Figure 6:
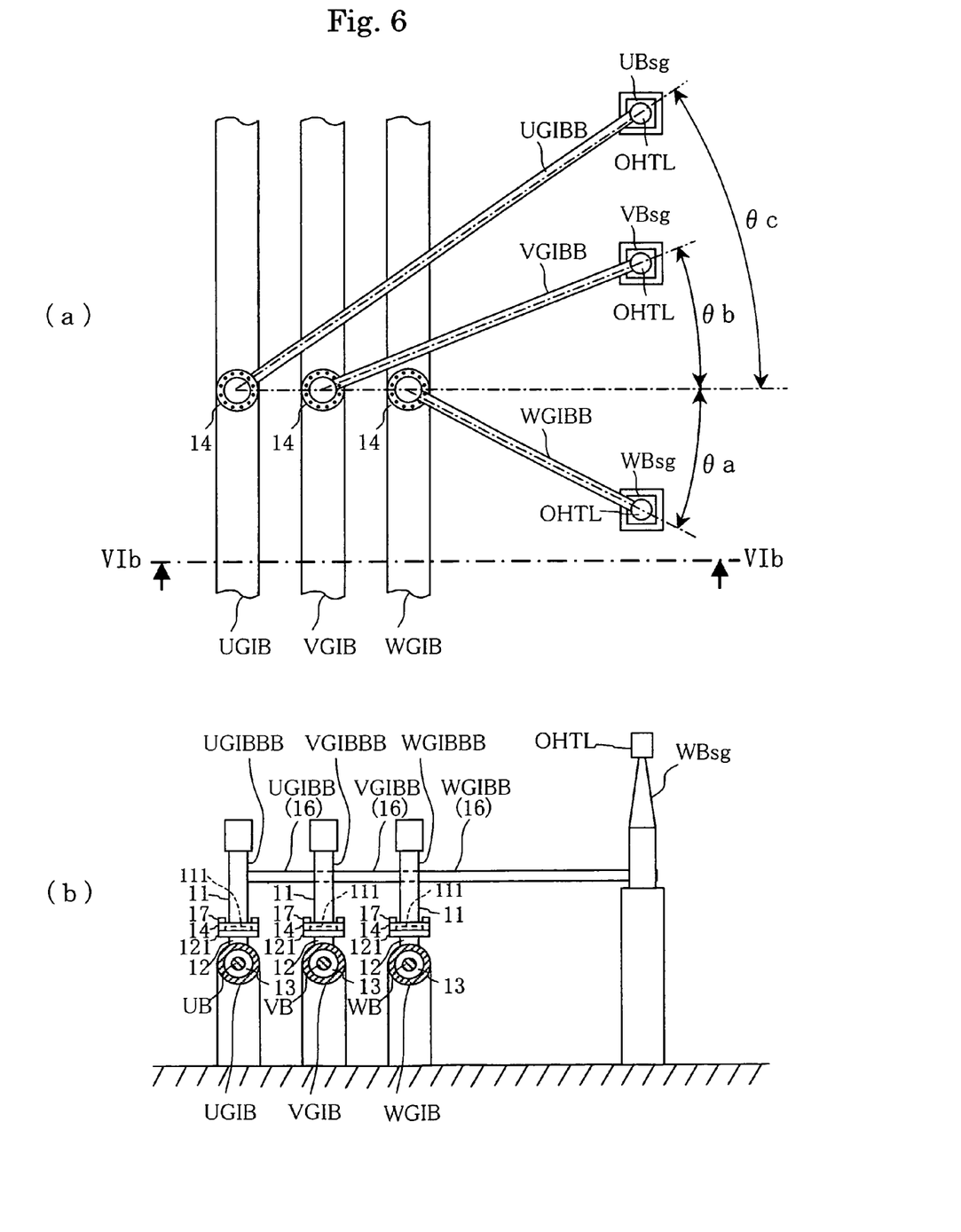
FIG. 6 illustrates views showing Embodiment 6 of the invention showing a case when the invention is applied to a case of connecting 3 phase buses and a bushing by a bushing lead out bus.

Embodiment 6 is an example when the invention is applied to a case of connecting 3 phase buses and a bushing by a bushing lead out bus, FIG. 6(a) is a plane view thereof, FIG. 6(b) is a side view viewed from VIb-VIb line of FIG. 6(a) in an arrow mark direction. Further, in FIG. 6, portions the same as or corresponding to those of FIG. 1, FIG. 2, FIG. 3, FIG. 4, FIG. 5 are attached with the same notations and Embodiment 6 of the invention will be explained mainly with regard to a point different from those of Embodiments 1, 2, 3, 4, 5 of the invention.

In FIGS. 6(a), (b), a U phase gas-insulated bus UGIB and a V phase gas-insulated bus VGIB and a W phase gas-insulated bus WGIB which are respectively prolonged are laid at an installed location of a substation or the like to extend in parallel.

Further, a U phase bushing UBsg and a V phase bushing VBsg and a W phase bushing WBsg are provided to align to be spaced apart from each other by sufficient leakage distances.

The U phase gas-insulated bus UGIB and the V phase gas-insulated bus VGIB and the W phase gas-insulated bus WGIB which are respectively prolonged are laid such that a direction of aligning the U phase bushing UBsg, the U phase bushing VBsg, the U phase bushing WBsg and the direction of extending the U phase gas-insulated bus UGIB and the V phase gas-insulated bus VGIB and the W phase gas-insulated bus WGIB constitute the same direction. Further, the respective phase gas-insulated buses UGIB, VGIB, WGIB include bus conductors UB, VB, WB insulated by the gas 13.

Further, a front end OHTL of each of the U phase bushing UBsg, the V phase bushing VBsg, the W phase bushing WBsg is connected to an overhead transmission line or a transformer bushing.

Further, the U phase gas-insulated bus UGIB and the U phase bushing UBsg are connected by way of a gas-insulted connection bus UGIBBB by a bushing lead out bus UGIBB of U phase constituting a gas-insulated bus.

Similarly, the V phase gas-insulated bus VGIB and the V phase bushing VBsg are connected by way of a gas-insulated connection bus VGIBBB of V phase by a bushing lead out bus VGIBB of V phase constituting a gas-insulated bus, and the W phase gas-insulated bus WGIB and the W phase bushing WBsg are connected by way of a gas-insulated connection bus WGIBBB by a bushing lead out bus WGIBB constituting a gas-insulated bus.

The gas-insulated connection buses UGIBBB, VGIBBB, WGIBBB each includes the first vessel (the other vessel) 12, the connection vessel (the one vessel) 11, the pressing member 14, the flange 121 of the first vessel (the other vessel) 12, the flange 111 of the connection vessel (the one vessel) 11, and the bolt 17 exemplified in FIGS. 1 through 5.

The flanges 121 of respective U, V, W phases are coupled to be fixed to the gas-insulated buses UGIB, VGIB, WGIB of respective corresponding U, V, W phases by way of the corresponding first vessels (the other vessels) 12.

The bushing lead out buses UGIBB, VGIBB, WGIBB of the respective phases correspond to the second vessels (branch pipe shape vessels) 16 exemplified in FIGS. 1 through 5.

Also in Embodiment 6, similar to, for example, the case of FIG. 1 or FIG. 2, before the other vessel (the first vessel) is screwed to the flange 121 by the bolt 17, the other vessel (the first vessel) 12 and the flange 121 thereof can be pivoted around the one vessel 11 and the flange 111. Therefore, even when the relative positions of the one vessel (the connection vessel) 11 and the other vessel (the first vessel) 12 in the peripheral direction are constituted by any positions, further, even when the swing angle of the second vessel (the branch pipe shape vessel) 16 relative to the other vessel (the first vessel) is constituted by any angle, the through hole 1411 of the pressing member 14 can easily be matched to the screw hole 1211 of the flange 121 of the other vessel 12, and the respective bolts 17 can easily and firmly be inserted to the respective through holes 1411 and screwed to the respective screw holes 1211. That is, integration or installation of various products can flexibly be dealt with out depending on only design of respective product specifications.

For example, when a swing angle θc of the U phase bushing lead out bus UGIBB, a swing angle θb of the V phase bushing lead out bus VGIBB, and a swing angle θa of the W phase bushing lead out bus WGIBB differ between those in design and those in installation at an actual cite, as described above, before the other vessel (the first vessel) 12 is screwed to the flange 121 by the bolt 17, the other vessel (the first vessel) 12 and the flange 121 thereof can be pivoted around the one vessel 11 and the flange 111. Therefore, even when the swing angle θc of the U phase bushing lead out bus UGIBB, the swing angle θb of the V phase bushing lead out bus VGIBB, and the swing angle θa of the W phase bushing lead out bus WGIBB differ from respective angles in design in installation at the actual cite, the swing angles can easily be adjusted. Further, the adjustment can be carried out even after the other vessel (the first vessel) 12 is screwed to the flange 121 by the bolt 17, depending on the degree of the screwing.

Embodiment 7

Figure 7:
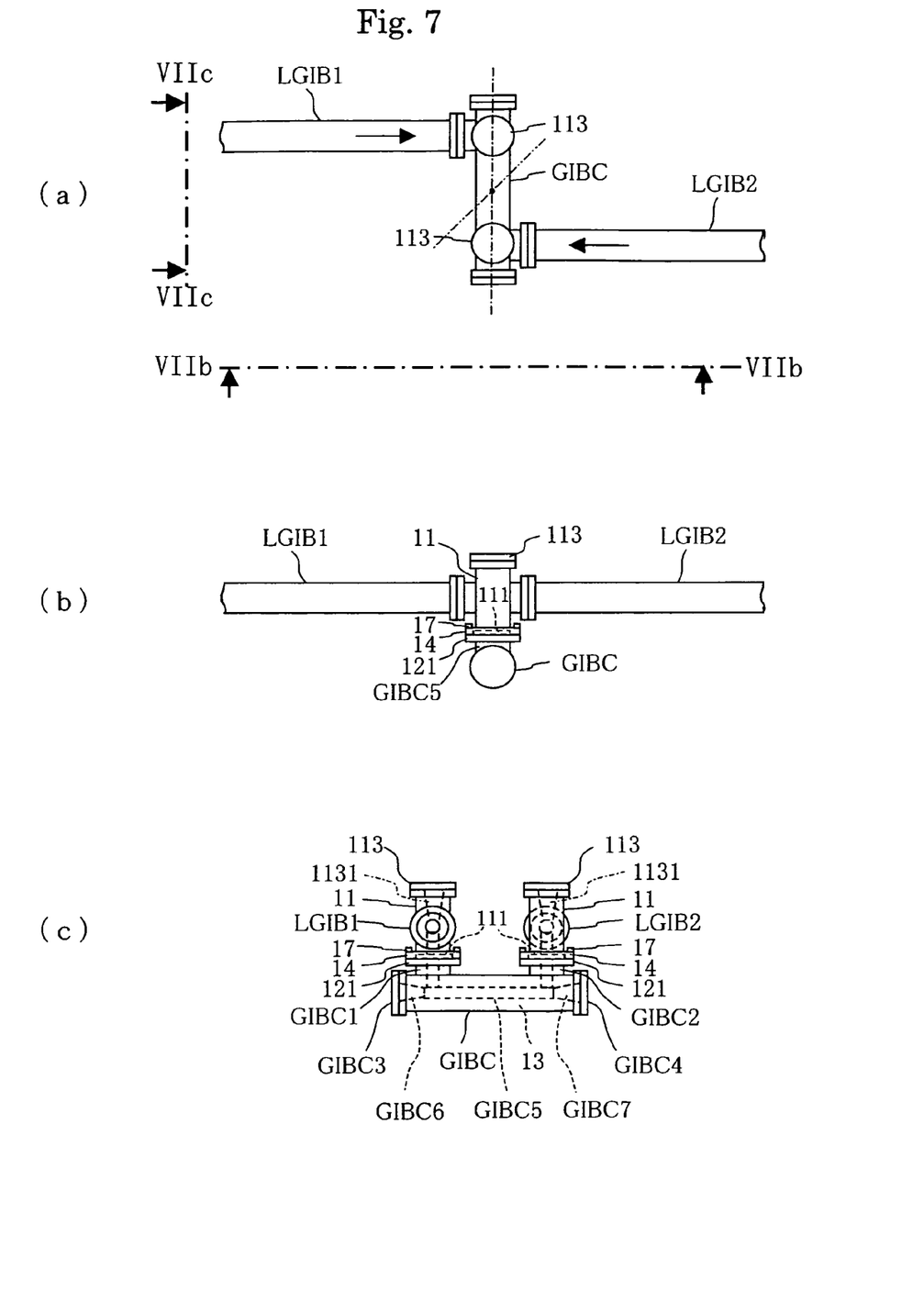
FIG. 7 illustrates views showing Embodiment 7 of the invention showing a case when the invention is applied to a case of connection of a prolonged first gas-insulated bus and a prolonged second gas-insulated bus.

Embodiment 7 is an example when the invention is applied to a connection between a prolonged first gas-insulated bus and a prolonged second gas-insulated bus, FIG. 7(a) is a plane view of the example, FIG. 7(b) is a front view viewed from VIIb-VIIb line of FIG. 7(a) in an arrow mark direction, FIG. 7(c) is a side view viewed from VIIc-VIIc line of FIG. 7(a) in an arrow mark direction. Further, in FIG. 7, portions the same as or corresponding to those of FIG. 1, FIG. 2, FIG. 3, FIG. 4, FIG. 5, FIG. 6 are attached with the same notations and Embodiment 7 of the invention will be explained as follows mainly with regard to a point different from those of Embodiments 1, 2, 3, 4, 5, 6 of the invention.

According to Embodiment 7 of the invention, as shown by FIG. 7, a prolonged first gas-insulated bus LGIB1 and a prolonged second gas-insulated bus LGIB2 are not arranged on the same axis line but arranged such that respective axis lines of the gas-insulated buses LGIB1, LGIB2 are shifted from each other.

A connection vessel GIBC intersects with directions of extending the first and the second gas-insulated buses LGIB1, LGIB2 in an extending direction thereof and integrally includes branch pipe shape vessels GIBC1, GIBC2 at both end portions of an outer periphery thereof.

The connection vessel GIBC includes end portion hermetically closing lids GIBC3, GIBC4 at both ends thereof. The end portion hermetically closing lids GIBC3, GIBC4 hermetically close inside of the connection vessel GIBC from outside.

A connection conductor GIBC5 insulated by the gas 13 at inside of the connection vessel GIBC is supported by the end portion hermetically closing lid GIBC3 by a column-like insulated support member GIBC6 at one end portion thereof and supported by the end portion hermetically closing lid GIBC4 by a column-like insulated support member GIBC7 at other end thereof.

In either of the branch pipe shape vessels GIBC1, GIBC2, the one vessel 11, the pressing member 14, the flange 111 of the one vessel 11 and the like exemplified in FIGS. 1 through 5 are coupled to the flanges 121 by the bolts 17.

The first and the second gas-insulated buses LGIB1, LGIB2 correspond to the second vessels (branch pipe shape vessels) 16 exemplified in FIGS. 1 through 5 and coupled to the corresponding vessels 11 on one side by way of the flanges LGIB11, LGIB21.

As has been explained in reference to FIGS. 1 through 6, the one vessel 11 and the flange 111 thereof can relatively be pivoted around the pressing member 14 and the flange 121 and the axis centers. Particularly, as described in paragraph Nos. [0021], [0022], the flange 121 and the pressing member 14 which are squeezing and the flange 111 which is squeezed are constituted by different metals, and a semi solid state lubricant of grease or the like is coated on the sliding face 1112 between the two flanges 111, 121 constituting portions at which the flange 111 and the flange 121 are brought into press contact with each other (refer to also FIG. 1(a), FIG. 2(a), FIG. 3 through FIG. 5).

Since the prolonged first gas-insulated bus LGIB1 and the prolonged second gas-insulated bus LGIB2 are prolonged, even when the buses are thermally elongated and contracted by a considerable amount by an environmental temperature change, according to the above-described constitution of Embodiment 7, thermal elongation and contraction of the first and the second gas-insulated buses LGIB1, LGIB2 can be absorbed by relatively pivoting the vessel 11 and the flange 111 and the pressing member 14 and the flange 121.

For example, as exemplified in FIG. 7(a), when the first and the second gas-insulated buses LGIB1, LGIB2 are elongated in a direction of an arrow mark A by elevating an environmental temperature, while pivoting the vessel 11 and the flange 111 and the pressing member 14 and the flange 121 relative to each other as described above, the respective vessels 11, 11 in correspondence with the first and the second gas-insulated buses LGIB1, LGIB2, and the connection vessel GIBC are pivoted in an arrow mark B direction centering on a center O in a longitudinal direction thereof.

When the first and the second gas-insulated buses LGIB1, LGIB2 are contracted in a direction reverse to the arrow mark A by lowering the environmental temperature, the vessel 11 and the flange 111 and the pressing member 14 and the flange 121 are pivoted relative to each other in a direction reverse to that of the case of elevating the temperature, the respective vessels 11, 11 and the connection vessel GIBC are pivoted in a direction reverse to the arrow mark B centering on the center O.

In this way, thermal elongation and contraction of the prolonged first and second gas-insulated buses LGIB1, LGIB2 can be absorbed by a bus connection device BCD having the above-described structure different from a bellows. Further, the bus connection device BCD is a portion excluding the first and the second gas-insulated buses LGIB1, LGIB2 in FIG. 7(a), FIG. 7(b), FIG. 7(c).

As described above, according to Embodiment 7, in the gas-insulated power apparatus in which the vessel 11, GIBC contiguous to each other are coupled by way of the flanges 111, 121, the power conductors 122, GIBC5 insulated from the vessel 11, GIBC by the insulating gas 13 are included in the vessels 11, GIBC, the contiguous vessels 11, GIBC are coupled by squeezing the flange 111 of the vessel 11 on one side to be coupled by the pressing member 14 screwed to the flange 121 of the vessel GIBC on other side and the flange 121 of the vessel GIBC on other side and the flange 121 of the vessel GIBC on other side.

Further, in other words, Embodiment 7 includes the first and the second vessels 11, 11 including the gas-insulated power conductors, and the connection vessel GIBC for connecting the first vessel 11 in correspondence with the first gas-insulated bus LGIB1 and the second vessel 11 in correspondence with the second gas-insulated bus LGIB2, and the first vessel 11 (in correspondence with the first gas-insulated bus LGIB1) and the connection vessel GIBC contiguous to each other are coupled and the second vessel 11 (in correspondence with the second gas-insulated bus LGIB2) and the connection vessel GIBC contiguous to each other are coupled by squeezing the flange 111 of the vessel 11 on one side to be coupled by the pressing member 14 screwed to the flange 121 of the vessel GIBC on other side to be coupled and the flange 121 of the vessel GIBC on other side.

Embodiment 8

Figure 8:
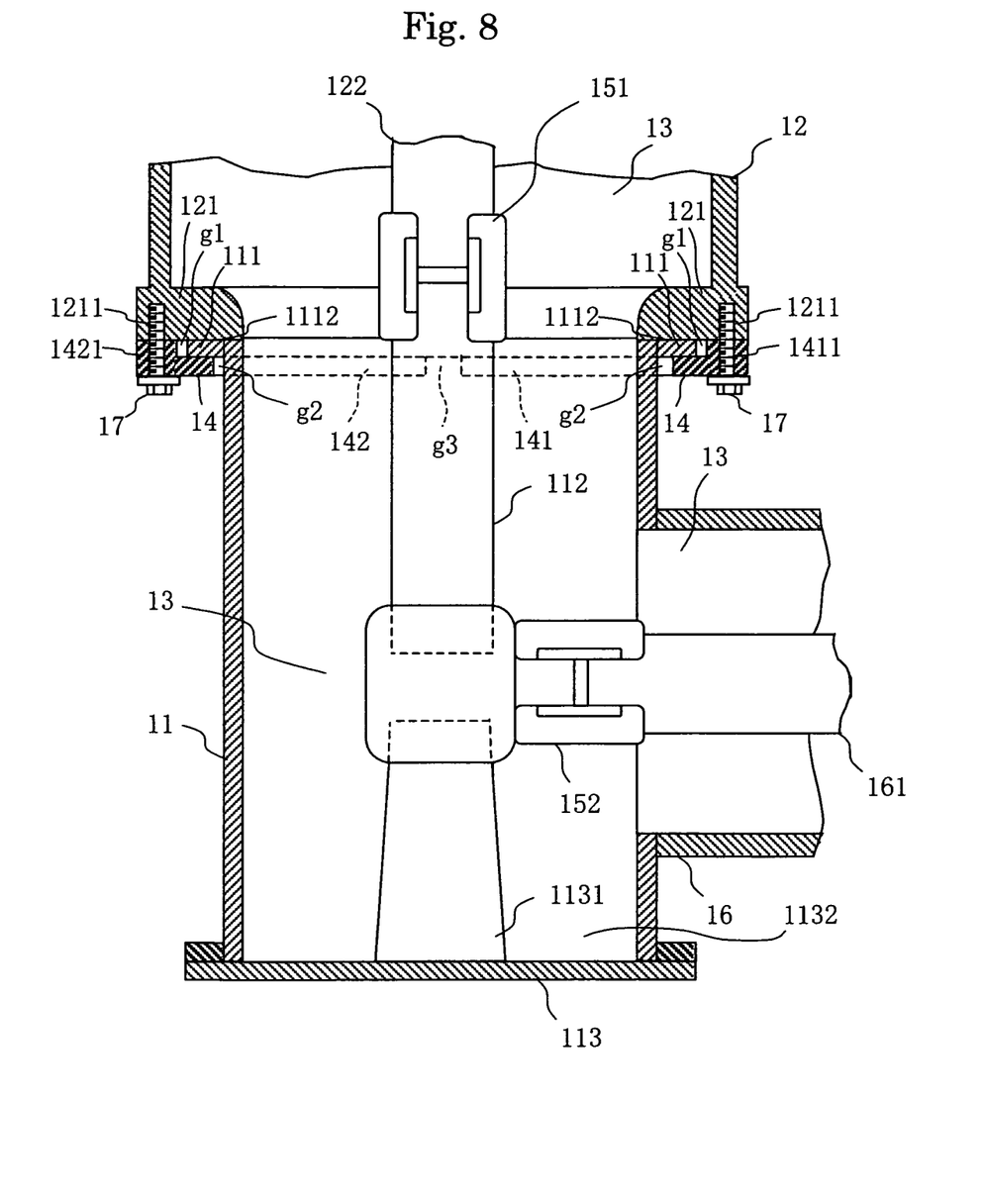
FIG. 8 is a view showing Embodiment 8 of the invention and a view showing a case of an essential portion of a gas-insulated power apparatus.

Embodiment 8 of the invention will be explained in reference to FIG. 8 showing an example of an essential portion of a gas-insulated power apparatus as follows. Further, in FIG. 8, portions the same as or corresponding to those of FIG. 1, FIG. 2, FIG. 3, FIG. 4, FIG. 5, FIG. 6, FIG. 7 are attached with the same notations and Embodiment 8 of the invention will be explained as follows mainly with regard to a point different from those of Embodiments 1, 2, 3, 4, 5, 6, 7 of the invention.

As shown by FIG. 8, Embodiment 8 of the invention is an example in which in a gas-insulated power apparatus coupling the contiguous vessels 11, 12 by squeezing the flange 111 of the vessel 11 on one side to be coupled by the pressing member screwed to the flange 121 of the vessel 12 on other side and the flange 121 of the vessel 12 on other side, the column-like insulating spacer 1131 is attached to the lower end portion hermetically closing lid 113 of the vessel 11 on one side, a bottom chamber 1132 surrounding a root portion of the column-like insulating spacer 1131 is formed and the bottom chamber 1132 is made to constitute a well-known particle trap.

As is well known, the particle trap is a portion of catching a particle of a metal small piece generated in integration and remaining at inside of the vessels 11, 12, 16, a contact metal powder scattered from a contact of the circuit breaker by operating the circuit breaker.

According to Embodiment 8, the bottom chamber 1132 constituting the particle trap is formed to surround the root portion of the column-like insulated spacer 1131 attached to the lower end portion hermetically closing lid 113, and therefore, the bottom chamber 1132 can be disposed on a lower side of the branch pipe shape vessel 16, and therefore, the bottom chamber 1132 is disposed at a position on a lower side of an upper end portion or a middle portion of the column-like insulated spacer 1131 determined in relation to a position of the inner power conductor 161 of the branch pipe shape vessel 16. Therefore, the particle trap constituting the bottom chamber 1132 according to Embodiment 8 can effectively catch the particle without effecting an influence so much on an insulating function of the column-like insulating spacer 1131.

Embodiment 9

Figure 9:
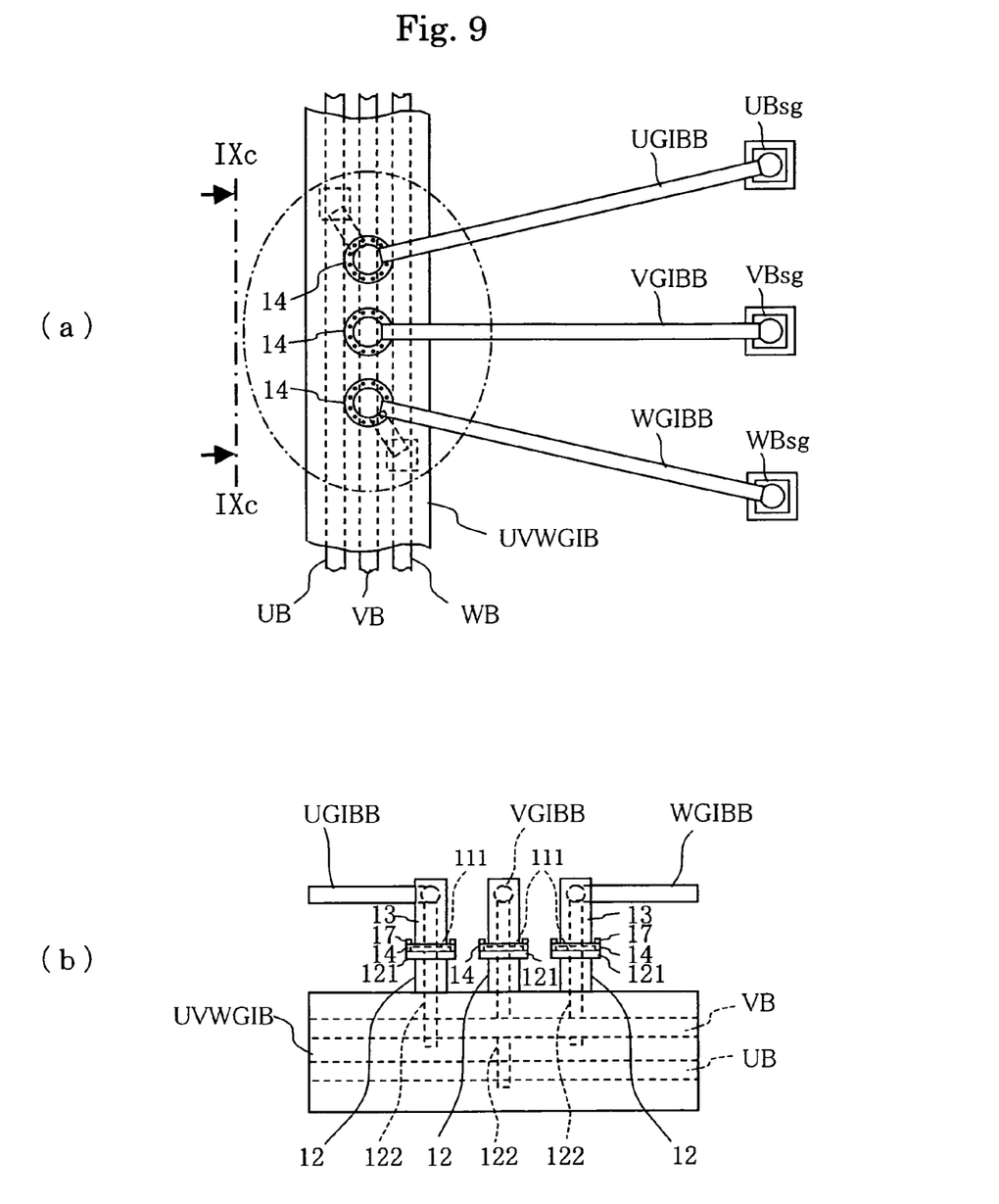
FIG. 9 illustrates views showing Embodiment 9 of the invention showing other case when the invention is applied to a case of connecting 3 phase buses and a bushing by a bushing lead out bus.

Embodiment 9 is other example when the invention is applied to the case of connecting the 3 phase buses and a bushing by a bushing lead out bus, FIG. 9(a) is a plane view thereof and FIG. 9(b) is a side view viewing a portion surrounded by a one-dotted chain line of FIG. 9(a) from a VIb-VIb line in an arrow mark direction. Further, in FIG. 9, portions the same as or corresponding to those of FIG. 1 through FIG. 8 are attached with the same notations and Embodiment 9 of the invention will be explained as follows mainly with regard to a point different from those of Embodiments 1 through 8 of the invention.

Although Embodiment 6 mentioned above is the example when the gas-insulated buses UGIB, VGIB, WGIB independent from each other in respective phases of U, V, W are laid, as exemplified in FIG. 9, the example of Embodiment 9 is an example when a so-to-speak 3 phase summarized bus UVWGIB in which the bus conductors UB, VB, WB of respective phases of U, V, W are included in a common vessel is laid.

According to Embodiment 9, the first vessels (the vessels on other side) 12, 12, 12 of respective phases U, V, W are coupled to top portions of a vessel UVWGIBC of the 3 phase summarized bus UVWGIB, and the respective vessels 12, 12, 12 of respective phases U, V, W are disposed at the same height. As a result, a direction of aligning the first vessels (vessels on other side) 12, 12, 12 of respective phases U, V, W is in parallel with the direction of aligning the bushings UBsg, VBsg, WBsg of respective phases.

The power conductor 122 at inside of the first vessel (the vessel on other side) 12 of U phase is connected to the bus conductor UB of U phase, the power conductor 122 at inside of the first vessel (the vessel on other side) 12 of V phase is connected to the bus conductor VB of V phase, the power conductor 122 at inside of the first vessel (the vessel on other side) 12 of W phase is connected to the bus conductor WB of W phase respectively at inside of the vessel UVWGIBC of the 3 phase summarized bus UVWGIB by way of tulip contacts or the like.

Owing to the structure, when the invention is applied to a case of connecting the 3 phase summarized bus and the bushing by the bushing lead out bus, an effect the same as that of Embodiment 6 is achieved by a simple structure.

BRIEF DESCRIPTION OF THE DRAWINGS

FIG. 1(a) is a vertical sectional side view, FIG. 1(b) is a cross-sectional plane view viewing a section at Ib-Ib line of FIG. 1(a) in an arrow mark direction.

FIG. 2(a) is a vertical sectional side view, FIG. 2(b) is a cross-sectional plane view viewing a section at IIb-IIb line of FIG. 2(a) in an arrow mark direction.

FIG. 6(a) is a plane view thereof, FIG. 6(b) is a side view viewed from VIb-VIb line of FIG. 6(a) in an arrow mark direction.

FIG. 7(a) is a plane view of the case, FIG. 7(b) is a front view viewed from VIIb-VIIb line of FIG. 7(a) in an arrow mark direction, FIG. 7(c) is a side view viewed from a VIIc-VIIc line of FIG. 7(a) in an arrow mark direction.

FIG. 9(a) is a plane view thereof, FIG. 9(b) is a side view viewing a portion surrounded by a one-dotted chain line of FIG. 9(a) from VIb-VIb line in an arrow mark direction.

DESCRIPTION OF REFERENCE NUMERALS AND SIGNS 11, 12 contiguous vessels
111, 121 flanges 1112 sliding face
112 power conductor
113 end portion hermetically closing lid
1131 column-like insulated spacer
1132 bottom chamber (particle trap)
1211 screw hole
121R, 121R1, 121R2 O rings
1212 fitting recess
122 power conductor
13 insulating gas
14, 141, 142 pressing members
1411, 1421 bolt through holes
1412, 1422 end faces of pressing members
151 in-vessel power conductor connector
152 power conductor connector in branch tube shape vessel
16 branch tube shape vessel
161 power conductor
17 bolt
g1, g2, g3 gaps
UB U phase bus conductor
VB V phase bus conductor
WB W phase bus conductor
GIBC connection vessel
GIBC1, GIBC2 branch tube shape vessels
GIBC6, GIBC7
GIBC3, GIBC4 end portion hermetically closing lids
GIBC5 connection conductor
GIBC6, GIBC7 column-like insulated support members
LGIB1 prolonged first gas-insulated bus
LGIB2 prolonged second gas-insulated bus
LGIB11, LGIB21 flanges
UVWGIB 3 phase summarized bus
UVWGIBC vessel
UGIB U phase gas-insulated bus
UGIBB bushing lead out bus of U phase
UGIBBB U phase gas-insulated connection bus
VGIB V phase gas-insulated bus
VGIBB bushing lead out bus of V phase
VGIBBB V phase gas-insulated connection bus
WGIB W phase gas-insulated bus
WGIBB bushing lead out bus of W phase
WGIBBB W phase gas-insulated connection bus
UBsg U phase busing
VBsg V phase bushing
WBsg W phase bushing
θa, θb, θc swing angles

The invention claimed is:

1. A gas-insulated power apparatus comprising at least first and second contiguous vessels being coaxially coupled to each other by way of respective flanges thereof, and power conductors included in the vessels and insulated from the vessels by an insulating gas, wherein a branch pipe shape vessel, which includes a power conductor disposed therein and insulated therefrom by the insulating gas, is connected to at least one of the first and second contiguous vessels so that the branch pipe shape vessel is substantially orthogonal to the coaxially coupled first and second contiguous vessels, the first and second contiguous vessels are coupled by squeezing a flange at an end of the second vessel to be coupled between a pressing member and a flange of the first vessel, the pressing member being screwed to the flange of the first vessel, and a lubrication layer is provided between the flange of the first vessel and the flange of the second vessel for maintaining airtightness between the flange of the first vessel and the flange of the second vessel and for permitting the flange of the first vessel and the flange of the second vessel to slide relative to each other in a peripheral direction of the flanges.

2. The gas-insulated power apparatus according to claim 1, wherein each of the first and second vessels is constituted by a tube-like shape and each of the flanges is constituted by a ring-like shape, and the pressing member is comprised of a plurality of pieces that are arranged in a ring-like shape along the flanges.

3. The gas-insulated power apparatus according to claim 1, wherein each of the first and second vessels is constituted by a tube-like shape and each of the flanges is constituted by a ring-like shape, and the pressing member is shaped as a continuous ring corresponding with the ring-like shape of the flanges and is fitted to the second vessel before attaching the flange of the second vessel to the second vessel.

4. The gas-insulated power apparatus according to claim 1, wherein the squeezed flange of the second vessel is fitted pivotably to a fitting recess of the flange of the first vessel.

5. The gas-insulated power apparatus according to claim 1, wherein the power conductors inside of the respective vessels are coaxially arranged, the coaxial power conductors are connected by an in-vessel power conductor connector permitting the power conductors to elongate and contract in an axial direction and permitting the power conductors to pivot in a peripheral direction.

6. The gas-insulated power apparatus according to claim 1, wherein the power conductors inside of the vessels are insulated from the vessels by a column-like insulated spacer attached to an end portion hermetically closing lid of at least one of the vessels.

7. The gas-insulated power apparatus according to claim 6, wherein the branch pipe shape vessel is connected to the second vessel;
wherein the power conductor inside of the branch pipe shape vessel is connected to the power conductor inside of the second vessel by way of a power conductor connector inside of the branch pipe shape vessel permitting the power conductor inside of the branch pipe shape vessel to elongate and contract in an axial direction; and
wherein the power conductor inside of the branch pipe shape vessel is insulated from the branch pipe shape vessel and the second vessel by the column-like insulated spacer for insulating the power conductor inside of the second vessel from the second vessel.

8. The gas-insulated power apparatus according to claim 6, wherein a particle trap is constituted by attaching the column-like insulated spacer to a lower end portion hermetically closing lid of the second vessel.

9. The gas-insulated power apparatus according to claim 1, wherein the pressing member includes a recess into which the flange of the second vessel is inserted, a depth of the recess being equal to a thickness of the flange of the second vessel.

10. A gas-insulated power apparatus comprising a first and a second vessel including power conductors insulated by a gas, and a connection vessel coaxially connecting the first and the second vessel to each other, wherein a branch pipe shape vessel, which includes a power conductor disposed therein and insulated therefrom by the gas, is connected to at least one of the first and second vessels so that the branch pipe shape vessel is substantially orthogonal to the coaxially connected first and second vessels, at least one of a coupling of the first vessel and the connection vessel contiguous to each other and a coupling of the second vessel and the connection vessel contiguous to each other is carried out by squeezing a flange at an end of either the first or second vessel to be coupled between a pressing member and a flange of the connection vessel, the pressing member being screwed to a flange of the connection vessel, and a lubrication layer is provided between the flange of either the first or second vessel and the flange of the connection vessel for maintaining airtightness between the flange of either the first or second vessel and the flange of the connection vessel and for permitting the flange of either the first or second vessel and the flange of the connection vessel to slide relative to each other in peripheral direction of the flanges.

11. The gas-insulated power apparatus according to claim 10, wherein each of the vessels is constituted by a tube-like shape and each of the flanges is constituted by a ring-like shape, and the pressing member is comprised of a plurality of pieces that are arranged in a ring-like shape along the flanges.

12. The gas-insulated power apparatus according to claim 10, wherein each of the vessels is constituted by a tube-like shape and each of the flanges is constituted by a ring-like shape and the pressing member is shaped as a continuous ring corresponding with the ring-like shape of the flanges and is fitted to the first or second vessel before attaching the flange of the first or second vessel to the respective first or second vessel.

13. The gas-insulated power apparatus according to claim 10, wherein the squeezed flange of either the first or second vessel is pivotably fitted to a fitting recess of the flange of the connection vessel.

14. The gas-insulated power apparatus according to claim 10, wherein the connection vessel includes a power conductor, and each of the respective power conductors included in the first vessel, the second vessel, and the connection vessel is insulated from the corresponding vessels by a column-like insulated spacer attached to an end portion hermetically closing lid of one of the vessels.

15. The gas-insulated power apparatus according to claim 10, wherein the flange of the first or second vessel and the flange of the connection vessel are in press contact with each other.

16. The gas-insulated power apparatus according to claim 15, wherein at least one of an O ring and coating a grease is provided between the flange of the first or second vessel and the flange of the connection vessel.

17. The gas-insulated power apparatus according to claim 10, wherein the flange of the connection vessel and the pressing member which are squeezing and the flange of the first or second vessel comprise different metals.

18. The gas-insulated power apparatus according to claim 10, wherein the pressing member includes a recess into which the flange of either the first or second vessel is inserted, a depth of the recess being equal to a thickness of the flange of the first or second vessel.

* * * * *